United States Patent
Farrugia

[11] Patent Number: 5,671,698
[45] Date of Patent: Sep. 30, 1997

[54] PET CARRIER

[76] Inventor: Dorothy Jeanine Farrugia, 225 N. Euclid Way, Anaheim, Calif. 92801

[21] Appl. No.: 541,610

[22] Filed: Oct. 10, 1995

[51] Int. Cl.[6] ............................................. A01K 29/00
[52] U.S. Cl. ...................................................... 119/497
[58] Field of Search ................................... 119/453, 496, 119/497, 500; D30/109

[56] References Cited

U.S. PATENT DOCUMENTS

| | | | |
|---|---|---|---|
| 290,176 | 6/1883 | Demeuse | D30/109 |
| D. 294,748 | 3/1988 | Dobelle | D30/109 |
| 295,276 | 4/1884 | Brown | D12/128 |
| D. 298,870 | 12/1988 | Heisler | D30/109 |
| 1,313,691 | 8/1919 | Hixson . | |
| 2,538,778 | 1/1951 | Halpin . | |
| 2,790,414 | 4/1957 | Rossow . | |
| 3,058,445 | 10/1962 | Johnson . | |
| 4,220,119 | 9/1980 | Albright | 119/497 |
| 4,397,398 | 8/1983 | Watanabe | 220/7 |
| 4,484,540 | 11/1984 | Yamamoto | 119/497 |
| 4,977,857 | 12/1990 | Slawinski | 119/497 |
| 5,170,745 | 12/1992 | Burdette, Jr. | 119/497 |
| 5,467,734 | 11/1995 | Ho | 119/498 X |
| 5,485,805 | 1/1996 | Meissner | 119/496 |

FOREIGN PATENT DOCUMENTS

| | | |
|---|---|---|
| 86746 | 12/1921 | Austria . |
| 2321840 | 4/1977 | France . |
| 2400207 | 7/1975 | Germany . |
| 27221 | 11/1907 | United Kingdom . |

OTHER PUBLICATIONS

Related advertising brochures.

*Primary Examiner*—Robert P. Swiatek
*Assistant Examiner*—Elizabeth Shaw
*Attorney, Agent, or Firm*—Dennis W. Beech

[57] ABSTRACT

The pet carrier is a housing having a rigid bottom panel enclosed in a bottom cover which is attached to a plastic mesh which is shaped to form the pet carrier sides and top. The plastic mesh is attached to inverted U shaped rigid frame members which hold the shape of the sides and top as well as provide structural support to protect the pet being transported. The pet carrier has a rear end panel and door of plastic mesh to complete the enclosure. The door is attached to the sides and top by two zippers. The top has a rigid top bar which is attached to the frame members and to which a carry handle is attached. The pet carrier also has two coupling rings attached to the top to which a shoulder strap may be attached. Coupling rings may also be attached to a side on a frame member for use in attachment to other items such as the seat belt of an automobile. There is provision for a tray and absorbent pad in the bottom of the pet carrier for hygiene as well as a cover to protect the pet from the environment. Pockets may be attached to the rear end and door panels.

13 Claims, 4 Drawing Sheets

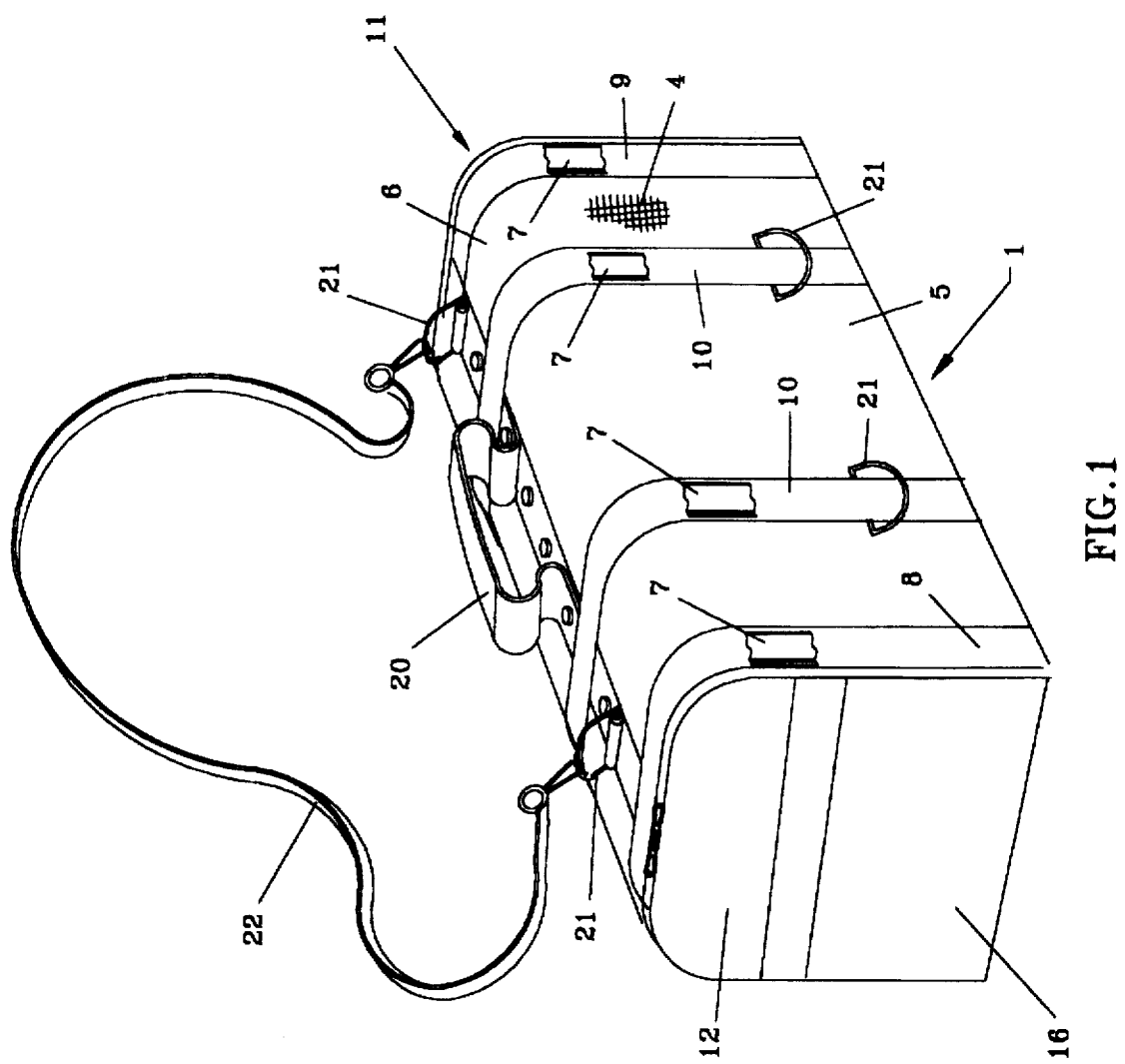

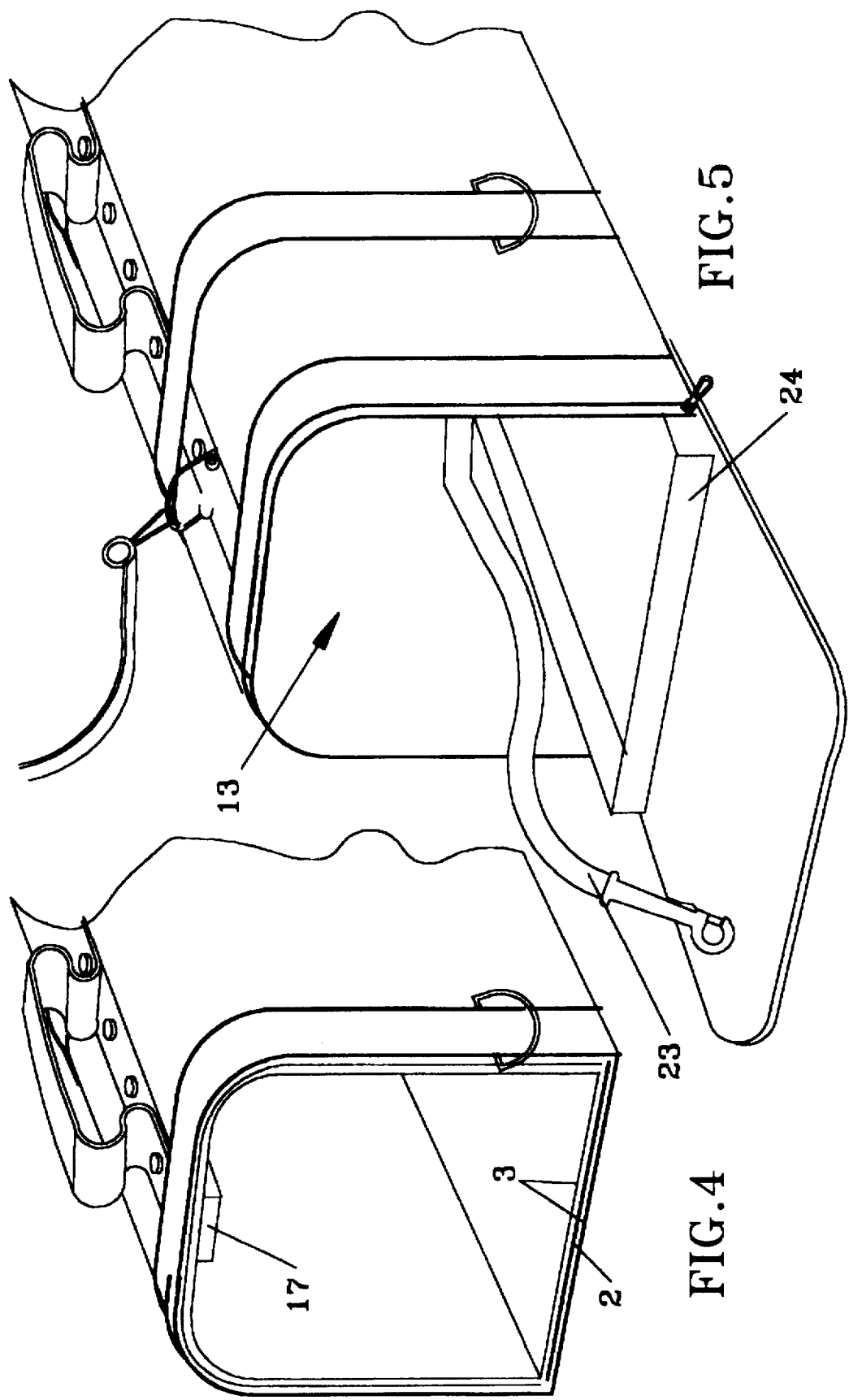

PET CARRIER

BACKGROUND OF THE INVENTION

1. Field of the Invention

This invention relates to devices used to carry a pet in a containment enclosure. The new device provides a light weight, structurally sound container in which a pet may be carried by a person or as carry on luggage when it is necessary to transport the pet.

2. Description of Related Art

There are currently in use many varieties of pet carrying containers. The most common example for pet transport are those used by common carriers such as airlines. These most often are rectangular plastic boxes formed of two parts, a top and a bottom, which may be separated about the middle circumference. These carriers are fastened together by screws and bolts. The door of the carrier is normally made of rigid wire crossed bars and the sides and rear walls may have openings with crossed bars for ventilation. The carriers provide maximum protection for the pet in transport to prevent any damage to the carrier and consequently the pet contained therein. These carriers usually have a carry handle similar to a suitcase. These carriers tend to be bulky and heavy and are not useful for a person to carry the pet. The size and weight limit their usefulness.

Other currently existing carriers include those designed to appear as large purses or handbags, utility bags and tote bags. These pet carriers tend to be flexible in construction and do not protect the pet from outside forces such as other luggage or hard objects.

Additionally there are all manner of collapsible pet carriers, some of which have ridged construction framework which would protect the pet. However, this need for additional structural framework in the case of those portable carriers creates awkward, bulky and heavy carrying devices. U.S. Pat. No. 2,538,778 to Halpin discloses a pet carrier with a semi-circular top with a shape form similar to the instant invention. The support structure has frame members that resemble inverted U shaped supports that are attached to a bar at the top of the pet carrier and to which a carrying handle is attached. This frame structure including pivot elements is significantly complicated and heavy due to the intent for a collapsible pet carrier design. The device does not use a see through mesh for the walls of the container. Collapsible pet carriers which do not have a sturdy structural framework do not provide adequate protection and safety for the pet.

None of the known art pet carriers provide a simple, lightweight, and portable pet carrier to confine the animal which provides comfort and hygiene for the pet and also provides a safe, sturdy structure for the protection of the pet. The present invention provides a simple generally open mesh container with a rigid bottom panel and inverted U shaped frame members attached to a top bar for an open environment yet structurally safe container. The lightweight plastic mesh construction retains the animal and provides a container comfortable for a person to carry. The combination of the open plastic mesh and simple sturdy frame structure has not been disclosed in the known art.

SUMMARY OF THE INVENTION

A primary objective of the present invention is to provide a pet carrier that may be conveniently use by a person to carrier the pet and to provide structural safety for the pet from the environment. Another object is to provide a pet carrier which provides as much ventilation and visibility for the pet within the parameters of containment and safety of the pet.

A further object is to provide a means to attach the pet collar of the pet to a clip hook and strap attached inside the pet carrier to prevent the pet from inadvertently falling or jumping out of the carrier. Another object is to provide convenient access to the pet carrier by means of a double zippered door in an end of the pet carrier as well as provide outside face pockets on the door and rear end of the carrier to store items.

Another object is to provide a carry handle for a person to carry the carrier as well as coupling rings which may be used with a shoulder strap to carry the pet. A further object is to provide coupling rings which may be used to attach the pet carriers to seat belts when automobile transportation is used.

Another object is to provide a plastic rectangular tray in which an absorbent pad may be placed. The rectangular tray is shaped to fit in the carrier on the bottom panel. A further object is to provide a cover which may be fit over the pet carrier to protect the pet in case of adverse environment such as rain or cold.

In accordance with the description presented herein, other objectives of this invention will become apparent when the description and drawings are reviewed.

BRIEF DESCRIPTION OF THE DRAWING

FIG. 1 illustrates a perspective view of the pet carrier.

FIG. 4 illustrates a cross-sectional view of the pet carrier.

FIG. 5 illustrates a perspective view with the door open and the rectangular tray partially removed.

DESCRIPTION OF THE PREFERRED EMBODIMENT

Figure 3:
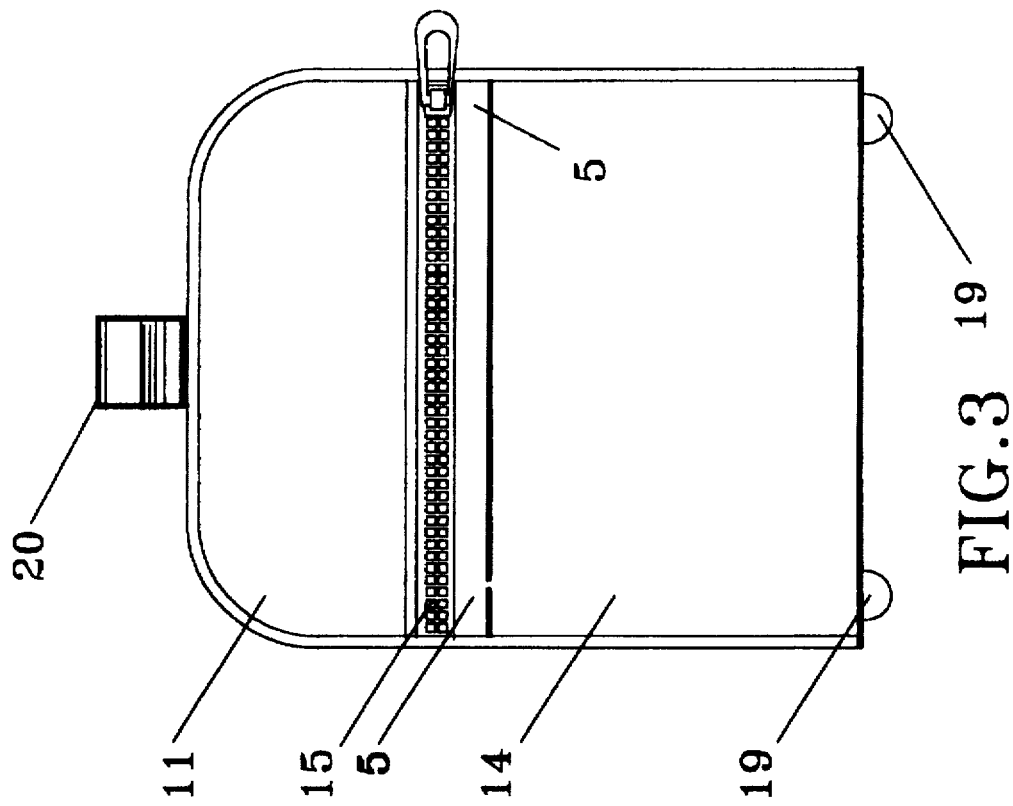
FIG. 3 illustrates a rear view of the pet carrier.

The pet carrier consists of a generally rectangular housing having a semi-circular top. The bottom is a rigid plastic panel enclosed in a plastic covering which is attached to a plastic mesh material shaped to form the sides and top of the carrier. Four U shaped frame members are attached to the plastic mesh material and bottom panel for structural support. A top bar is attached to the plastic mesh and U shaped frame members. The housing has a double zipper door and a rear end to confine the pet. A carry handle is attached to the top bar for a person to hold the carrier.

Referring to FIGS. 1 through 4, the pet carrier (1) has a rigid bottom panel (2) enclosed in a bottom cover (3) which is attached to a plastic mesh (4) forming the sides (5) and top (6) of the pet carrier (1). Four U shape frame members (7) are attached to the plastic mesh (4) forming a door frame member (8), rear end frame member (9) and intermediate frame members (10). The frame members are structurally formed of rigid plastic, metal or other suitable material to provide protection to the pet in the carrier. Normally the frame members (7) are attached by enclosure in a web material such as plastic or canvas which is then attached to the plastic mesh (4) and bottom cover (3) by machine stitching. A rear end (11) plastic mesh panel is permanently attached and a door (12) is attached to the bottom cover (3)

and slidable fastened to the front access opening (13) rim. This provides an enclosure to retain the pet and provide access to the enclosure to place the pet in and remove it from the enclosure.

The rear end (11) plastic mesh is normally attached by use of a common end seam using machine stitching. The rear end (11) may have a rear pocket (14) attached for the purpose of carrying items. The rear pocket (14) may also have a means for closing such as a pocket zipper (15). The door may also have a door pocket (16).

While a zipper has been described, other fasteners such as hook and loop may be used. A non-corrosive zipper is preferable if used.

Figure 2:
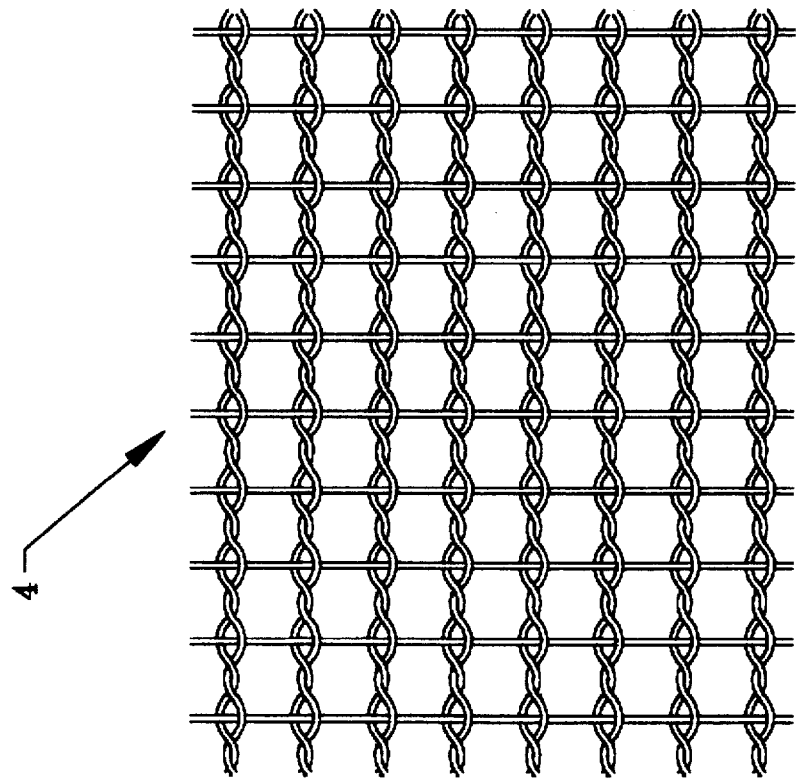
FIG. 2 illustrates an enlarged view of the mesh construction of the pet carrier.

The plastic mesh (4) is a woven mesh as illustrated in FIG. 2 which mesh has been treated such that the plastic strands are attached at contact points. This provides a sturdy mesh which will resist the force of a pet against the mesh. Such a mesh has been found to be structurally strong enough to form the seat of a chair in which a person may sit.

A top bar (17) is attached to the plastic mesh (4) and the frame members (7). The top bar (17), normally of rigid plastic, metal or other suitable material, may be placed inside the pet carrier (1) and riveted to the four frame members (7). In this case a cloth strap (18) is placed opposite on the outside of the pet carrier (1) to provide support for the rivets against the plastic mesh (4). This arrangement provides protection for the pet in the pet carrier from outside forces such as other objects falling on the pet carrier (1).

The bottom panel (2) may have four supporting legs (19) attached.

The top bar (17) has a carry handle (20) attached for purposes of holding the pet carrier (1). Two or more coupling rings (21) may also be attached to the top bar (17). This provides for attachment of a snap swivel shoulder strap (22) to allow carrying by placing the strap on a persons shoulder.

Coupling rings (21) may also be attached at the side (5) of the pet carrier (1) by attachment to the frame members (7). This provides for clip or strap attachment to other structure such as the seat belt of an automobile.

A strap and clip (23) may also be attached inside the pet carrier (1) as illustrated in FIG. 5. When the collar of the pet is attached to the strap and clip (23) it prevents the pet from inadvertently falling or jumping out of the pet carrier (1).

Figure 6:
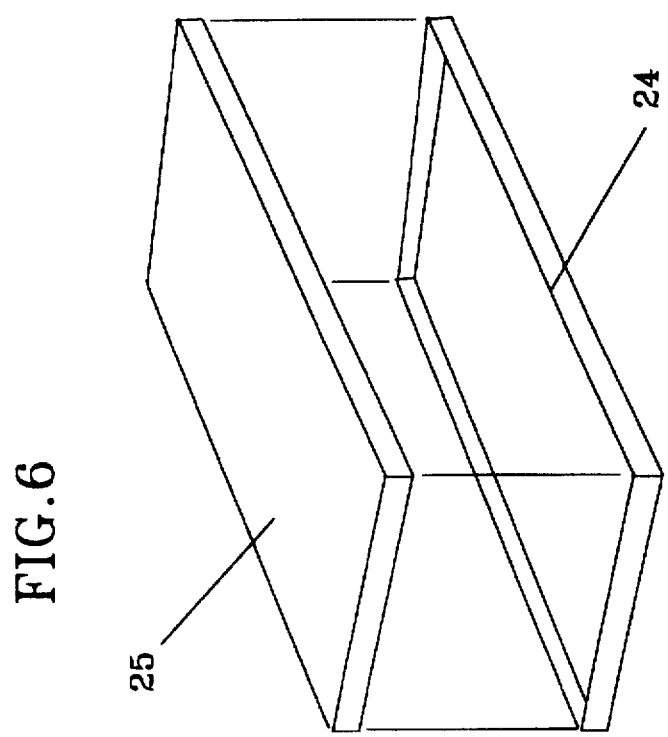
FIG. 6 illustrates a perspective view of the tray and absorbent pad.

Referring to FIGS. 5 and 6 a rectangular tray (24) of plastic may be placed in the bottom of the pet carrier (1). An absorbent pad (25) is then placed in the tray (24) for hygiene purposes.

Figure 7:
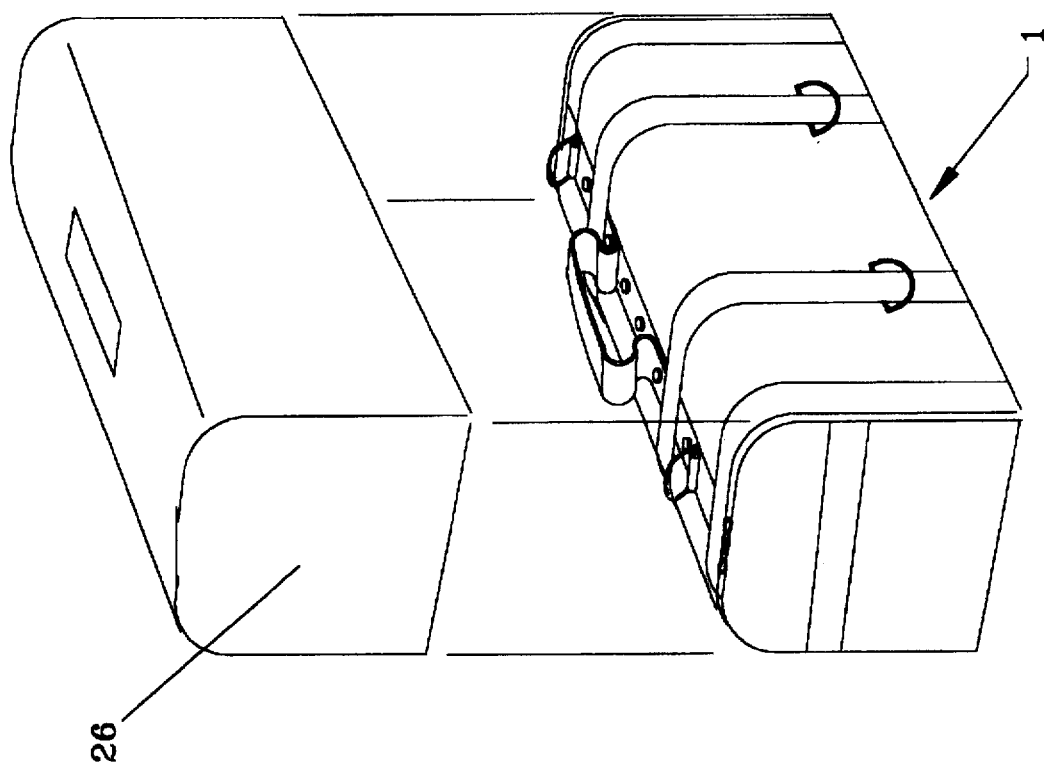
FIG. 7 illustrates the pet carrier and cover.

Referring to FIG. 7 a cover (26) is shown positioned to be placed over the pet carrier (1) to protect the pet from the environment.

I claim:

1. A device for transporting small animals comprising:

a pet carrier generally rectangular in shape having a bottom panel contained in a bottom cover which bottom cover is attached to a plastic mesh which forms two sides and a top;

a frame member contained in a cover strap wherein the frame member is an inverted U shape and the frame member with the cover strap is attached to the plastic mesh to form a door frame member, a rear end frame member and two intermediate frame members;

a rear end plastic mesh member attached at the rear end frame member and a door attached to the bottom cover of the pet carrier having a front access opening defined therein and the door to the door frame member with a slidable fastener; and a carry handle attached to the top.

2. The device as in claim 1 wherein the door slidable fastener is a zipper.

3. The device as in claim 1 wherein there is a top bar mounted in the pet carrier against the top and a cover strap mounted on the top opposite the top bar wherein the top bar, the cover strap and the frame members are attached by a means for attachment and the carry handle is attached to the top bar by a means for attachment.

4. The device as in claim 3 wherein there are two coupling rings attached to the top bar intermediate the door and the rear end to which coupling rings a shoulder strap may be attached.

5. The device as in claim 1 wherein a coupling ring is attached to the frame member.

6. The device as in claim 1 wherein the rear end panel has a rear pocket attached.

7. The device as in claim 6 wherein the rear pocket has a pocket zipper closure.

8. The device as in claim 1 wherein the door has a door pocket attached.

9. The device as in claim 1 wherein there is a combination strap and clip attached in the pet carrier.

10. The device as in claim 1 wherein there are four legs attached to the bottom panel and the bottom cover.

11. The device as in claim 1 wherein there is a tray removably placed on the inside of the pet carrier on the bottom panel and the bottom cover.

12. The device as in claim 11 wherein there is an absorbent pad contained in the tray.

13. The device as in claim 1 wherein there is a cover.

* * * * *